(12) United States Patent  
Borra et al.

(10) Patent No.: US 12,446,126 B2  
(45) Date of Patent: Oct. 14, 2025

(54) GRADUALLY REDUCING A LIGHT SETTING BEFORE THE START OF A NEXT SECTION

(71) Applicant: SIGNIFY HOLDING B.V., Eindhoven (NL)

(72) Inventors: Tobias Borra, Rijswijk (NL); Dzmitry Viktorovich Aliakseyeu, Eindhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 175 days.

(21) Appl. No.: 18/272,381

(22) PCT Filed: Jan. 6, 2022

(86) PCT No.: PCT/EP2022/050195  
§ 371 (c)(1),  
(2) Date: Jul. 14, 2023

(87) PCT Pub. No.: WO2022/152612  
PCT Pub. Date: Jul. 21, 2022

(65) Prior Publication Data  
US 2024/0114610 A1   Apr. 4, 2024

(30) Foreign Application Priority Data  
Jan. 15, 2021 (EP) .................................. 21151751

(51) Int. Cl.  
*H05B 47/10* (2020.01)  
*H05B 45/10* (2020.01)  
(Continued)

(52) U.S. Cl.  
CPC ............ *H05B 47/197* (2024.01); *H05B 45/10* (2020.01); *H05B 45/20* (2020.01); *H05B 47/155* (2020.01)

(58) Field of Classification Search  
CPC ........ H05B 45/10; H05B 45/20; H05B 47/10; H05B 47/105; H05B 47/11; H05B 47/115;  
(Continued)

(56) References Cited

U.S. PATENT DOCUMENTS 11,475,664 B2 *  10/2022  Van De Sluis .... H04N 21/4131  
11,510,300 B2 *  11/2022  Rycroft ................ H05B 47/105  
(Continued)

FOREIGN PATENT DOCUMENTS

WO   2019042986 A1   3/2019  
WO   2019234028 A1   12/2019

*Primary Examiner* — Long Nguyen

(57) ABSTRACT

A system for controlling a lighting device to render light effects while an audio rendering device plays a song is configured to receive information from an audio streaming service and determine the light effects based on the information. The information is indicative of a plurality of sections of the song. The system is further configured to determine, from the information, a first median or average of an audio characteristic in a first section (71) and a second median or average of the audio characteristic in a second consecutive section (72), determine whether a difference between the first and second medians or averages exceeds a threshold, gradually reduce a light intensity (61) and/or color saturation of the light effects during a period (74) before the start (65) of the second section in dependence on the difference exceeding the threshold, and control the lighting device to render the light effects.

15 Claims, 8 Drawing Sheets

(51) Int. Cl.
*H05B 45/20* (2020.01)
*H05B 47/155* (2020.01)
*H05B 47/175* (2020.01)

(58) Field of Classification Search
CPC .... H05B 47/14; H05B 47/155; H05B 47/175; H05B 47/196; H05B 47/197
See application file for complete search history.

(56) References Cited

U.S. PATENT DOCUMENTS

| | | |
|---|---|---|
| 2010/0071535 A1 | 3/2010 | McKinney et al. |
| 2010/0176752 A1 | 7/2010 | Xiong |
| 2019/0069375 A1 | 2/2019 | Baker et al. |
| 2019/0090328 A1 | 3/2019 | Sakagami et al. |

* cited by examiner

GRADUALLY REDUCING A LIGHT SETTING BEFORE THE START OF A NEXT SECTION

CROSS-REFERENCE TO PRIOR APPLICATIONS

This application is the U.S. National Phase application under 35 U.S.C. § 371 of International Application No. PCT/EP2022/050195, filed on Jan. 6, 2022, which claims the benefit of European Patent Application No. 21151751.1, filed on Jan. 15, 2021. These applications are hereby incorporated by reference herein.

FIELD OF THE INVENTION

The invention relates to a system for controlling a lighting device to render light effects while an audio rendering device plays a song.

The invention further relates to a method of controlling a lighting device to render light effects while an audio rendering device plays a song.

The invention also relates to a computer program product enabling a computer system to perform such a method.

BACKGROUND OF THE INVENTION

To create a more immersive experience for a user who is listening to a song being played by an audio rendering device, a lighting device can be controlled to render light effects while the audio rendering device plays the song. In this way, the user can create an experience at home which somewhat resembles the experience of a club or concert, at least in terms of lighting. An example of such a light control system is disclosed in US 2019/0090328 A1.

To create an immersive light experience, the accompanying light effects should match the music in terms of e.g. color, intensity, and/or dynamics. The light effects may be synchronized to the bars and/or beats of the music or even to the rhythm of the music, for example.

To improve the lighting experience, the system disclosed in US 2019/0090328 detects whether a section of a song is a note-fractioned section, a level-varying section, or a fill-in section and selects light effects for the section based on the detected type of the section, e.g. light blinking to sixteenth-note striking, light brightness increasing with an increase in sweep sound, or light brightness gradually dropping. However, this system is suboptimal in creating an immersive light experience.

WO 2019/234028 A1 discloses an electronic device configured to determine information indicating or affecting a variation in delay, e.g. variations in one or more delay components, between a content frame being rendered, e.g. by a mobile device, and a light effect synchronized to the content frame starting to be rendered. The electronic device is further configured to select one or more light effects to be rendered simultaneously with a content item based on the determined information and cause one or more light sources to render the selected one or more light effects simultaneously with the content item.

SUMMARY OF THE INVENTION

It is a first object of the invention to provide a system, which controls a lighting device to render immersive light effects related to a song while an audio rendering device plays the song.

It is a second object of the invention to provide a method, which can be used to control a lighting device to render immersive light effects related to a song while an audio rendering device plays the song.

In a first aspect of the invention, a system for controlling a lighting device to render light effects while an audio rendering device plays a song comprises at least one receiver, at least one transmitter, and at least one processor configured to receive information from an audio streaming service via said at least one receiver, said information being indicative of a plurality of sections of said song, determine, from said information, a first median or average of an audio characteristic in a first section of said plurality of sections and a second median or average of said audio characteristic in a second consecutive section of said plurality of sections, determine whether a difference between said first and second medians or averages exceeds a threshold, determine said light effects based on said information, gradually reduce a light intensity and/or color saturation of said light effects during a period before the start of said second section in dependence on said difference exceeding said threshold, and control, via said at least one transmitter, said lighting device to render said light effects.

Thus, when the difference between the first and second medians or averages exceeds the threshold, the system creates an anticipatory fading effect that builds up anticipation until the moment the second section starts, which is considered to be a key moment, and thereby creates an immersive light experience. Said audio characteristic may comprise audio intensity (sometimes referred to as loudness) or frequency, for example. Said period may start between 5 and 15 seconds before the start of said second section, for example. Said threshold may be 5 dB for audio intensity, for example. Compared to averages, medians are not skewed so much by a small proportion of extremely large or small values (outliers).

By not determining lighting effects for a section based only on an analysis of the section itself, as disclosed in US 2019/0090328, but based on differences between audio characteristics of different sections, immersive light effects may be created that would otherwise not be created.

Said information received from said audio streaming service may comprise data points for said plurality of sections of said song and said at least one processor may be configured to determine said first and second medians or averages from said data points. The system may thus be able to use data provided by an audio streaming service, e.g. Spotify, and not need to analyze the song itself. The system can therefore be relatively simple compared to the system of US 2019/0090328.

The information received from the audio streaming service is indicative of a plurality of sections of the song but does not necessarily distinguish between different sections. For example, when the information comprises data points, these data points (e.g. loudness points) may not only be used determine the medians or averages, but may also be used to identify the start and end of each section before determining these medians or averages.

Said at least one processor may be configured to select a subset of said data points, an audio intensity of said selected data points exceeding a further threshold, and determine said light effects based on said selected data points. In other words, not only the differences between the first and second medians or averages, but also the light effects themselves, may be determined from data points obtained from the audio streaming service. Alternatively, the system may analyze the song and determine the light effects based on this analysis or determine the light effects from a received light script.

Said at least one processor may be configured to obtain lighting control limitations set by a user and comply with said lighting control limitations when performing said reduction of said light intensity and/or color saturation. Alternatively, said at least one processor may be configured to obtain lighting control limitations set by a user and ignore said lighting control limitations when performing said reduction of said light intensity and/or color saturation. The lighting control limitations may be specified by user preferences like color palette and/or minimum light intensity (sometimes referred to as brightness).

Said at least one processor may be configured to increase said light intensity and/or color saturation of said light effects at the start of said second section in dependence on said difference exceeding said threshold. The start of the second section is a key moment that is emphasized by the anticipatory fading, but this key moment may be further emphasized by increasing the light intensity and/or color saturation of the light effects at the start of the second section.

Said at least one processor may be configured to increase said light intensity and/or color saturation of said light effects during a further period immediately after the start of said second section in dependence on said difference exceeding said threshold and gradually reduce said increase during said further period. By increasing the light intensity and/or color saturation also for light effects in the further period but gradually reducing the increase until the light effects are rendered at a normal level of light intensity and/or color saturation, the key moment is further emphasized.

Said at least one processor may be configured to obtain lighting control limitations set by a user and ignore said lighting control limitations when performing said increase of said light intensity and/or color saturation. The lighting control limitations may be specified by user preferences like color palette and/or maximum light intensity.

Said at least one processor may be configured to control said lighting device to render a special light effect at the start of said second section in dependence on said difference exceeding said threshold. In this way, the start of the second section is further emphasized following the anticipatory fading. The special light effect may be a flash, for example.

Said at least one processor may be configured to control a plurality of lighting devices to render said light effects at the start of said second section and to control a proper subset of said plurality of lighting devices to render said light effects during said period before the start of said second section in dependence on said difference exceeding said threshold. By using less lighting devices to render the lighting effects during the period, i.e. during the anticipatory fading, the effect of the anticipatory fading is increased. This may be especially beneficial when lighting control limitations need to be complied with and the allowable reduction of the light intensity is relatively small.

Said at least one processor may be configured to determine a level of said reduction of said light intensity and/or color saturation based on said difference between said first and second medians or averages. For example, the difference between the first and second medians or averages may be considered to represent the build-up in the music that leads to the start of the second section and the level of the reduction thus depends on this build-up in the music. Alternatively, the build-up in the music may be determined in a different manner, e.g. by analyzing only a part of the current section and/or based on the approximate duration of the build-up.

In a second aspect of the invention, a method of controlling a lighting device to render light effects while an audio rendering device plays a song comprises receiving information from an audio streaming service, said information being indicative of a plurality of sections of said song, determining, from said information, a first median or average of an audio characteristic in a first section of said plurality of sections and a second median or average of said audio characteristic in a second consecutive section of said plurality of sections, determining whether a difference between said first and second medians or averages exceeds a threshold, determining said light effects based on said information, gradually reducing a light intensity and/or color saturation of said light effects during a period before the start of said second section in dependence on said difference exceeding said threshold; and controlling said lighting device to render said light effects. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for determining a suitability of an input modality for controlling a lighting device to render light effects while an audio rendering device plays a song.

The executable operations comprise receiving information from an audio streaming service, said information being indicative of a plurality of sections of said song, determining, from said information, a first median or average of an audio characteristic in a first section of said plurality of sections and a second median or average of said audio characteristic in a second consecutive section of said plurality of sections, determining whether a difference between said first and second medians or averages exceeds a threshold, determining said light effects based on said information, gradually reducing a light intensity and/or color saturation of said light effects during a period before the start of said second section in dependence on said difference exceeding said threshold; and controlling said lighting device to render said light effects.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

DETAILED DESCRIPTION OF THE EMBODIMENTS

Figure 1:
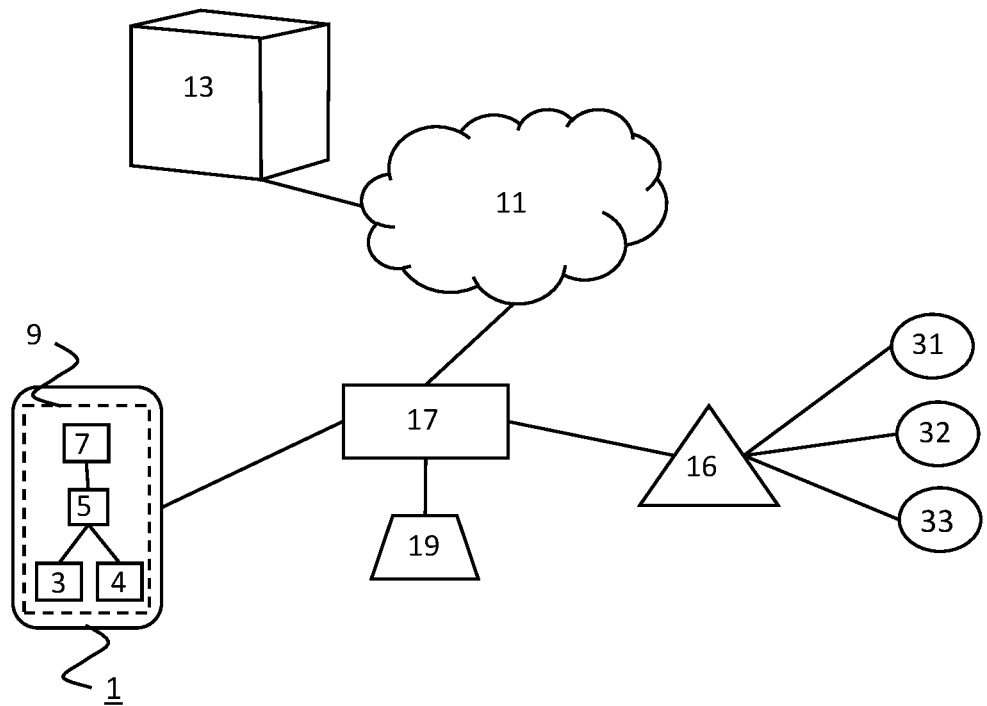
FIG. 1 is a block diagram of a first embodiment of the system.

FIG. 1 shows a first embodiment of the system for controlling a lighting device to render light effects while an audio rendering device plays a song. In this first embodiment, the system is a mobile device 1. A lighting system comprises a bridge 16 and lighting devices 31-33. Lighting devices 31-33 can be controlled via bridge 16, e.g. using Zigbee technology. Lighting devices 31-33 may be Philips Hue lamps, for example. The bridge 16 may be a Philips Hue bridge, for example.

The bridge 16 is connected to a wireless LAN access point 17, e.g. via Wi-Fi or Ethernet. The wireless LAN access point 17 is connected to the Internet 11. Mobile device 1 is able to control lighting devices 31-33 via the wireless LAN access point 17 and the bridge 16. Internet server 13 is a server of an audio streaming service, e.g. Spotify. The Internet server 13 is also connected to the Internet 11. Instead of a single Internet server, a cluster of Internet servers may be used. This cluster may be part of one or more clouds.

The mobile device 1 comprises a receiver 3, a transmitter 4, a processor 5, memory 7, and a touchscreen display 9. The processor 5 is configured to receive, from the Internet server 13, via the receiver 3, information which is indicative of a plurality of sections of a song and determine, from the information, a first median or average of an audio characteristic in a first section of the plurality of sections and a second median or average of the audio characteristic in a second consecutive section of the plurality of sections, e.g. for each two consecutive sections of the song. The audio characteristic may comprise audio intensity, for example.

The processor 5 is further configured to determine whether a difference between the first and second medians or averages exceeds a threshold, determine the light effects based on the information, gradually reduce a light intensity and/or color saturation of the light effects during a period before the start of the second section in dependence on the difference exceeding the threshold, and control, via the transmitter 4, one or more of the lighting devices 31-33 to render the light effects. The period may start between 5 and 15 seconds before the start of the second section, for example.

For instance, a user may be able to select a given song for playback using mobile device 1, which will then be accompanied by light effects on one or more of the lighting devices 31-33. The song may be output on speakers of the mobile device 1 (not shown), on headphones/earphones connected to the mobile device 1 (now shown), or on a smart speaker system 19, for example.

The light effects may be determined based on the metadata provided by Spotify, consisting of highly detailed audio descriptors. Based on this metadata, and the setup of the user, a light script can be created and then streamed to the lighting device(s). The generated light effects are 'in sync' with the song being played. 'In sync' means that the accompanying light effects match the music in terms of e.g. color, intensity, and/or dynamics, and may involve a temporal sync where key elements in the music are rendered on the lighting devices with a non-noticeable temporal difference. Especially for key moments in the music like a section change, the most immersive experience will be created when the light effects highlight these key moments.

The information received from the audio streaming service may specify the median or average of the audio characteristic per section and/or may comprise data points, e.g. per event. The information may comprise data points for the bars, beats, sections, and/or segments of the song, for example. The processor 5 may be configured to determine first and second medians or averages from the data points. An example of an audio streaming service providing such information/metadata is Spotify. Spotify indicates the start and duration of each section of the song. A section may be a verse or chorus, for example. Sections are not labelled and may have different durations. Spotify indicates a loudness per section and indicates an onset loudness, peak loudness, and offset loudness per segment. Segments may correspond to piano notes, for example.

In the embodiment of FIG. 1, the information comprises data points and the processor 5 is further configured to select a subset of the data points of which the audio intensity (normally expressed in dB) exceeds an audio intensity threshold. This audio intensity threshold may be dynamic. The number of selected data points may be reduced to increase smoothness. If the processor 5 determines the first and second medians or averages from the data points, then it determines the first and second medians or averages from all data points in the section and not just from the subset of data points.

The processor 5 is further configured to determine the light effects based on the selected data points. In a first implementation, only the light intensity of the light effects depends on the audio intensity specified in the metadata. In this first implementation, to determine a color for the light effect, a random number is picked to determine whether the color should be changed within the color palette or even whether a specific color should be selected within the color palette. The color palette may be chosen by the manufacturer and/or selected based on the genre of the song.

During the anticipatory fading, preferably both light intensity and color saturation are faded out, but it is also possible to fade out only lighting intensity or only color saturation. At the start of the second section, at least the original light intensity and/or color saturation are rendered. At that moment, there is no longer any reduction due to fading.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor of the mobile device 1 may run an Android or iOS operating system for example. The display 9 may comprise an LCD or OLED display panel, for example. The processor 5 may use touch screen display 9 to provide a user interface, for example. The memory 7 may comprise one or more memory units. The memory 7 may comprise solid state memory, for example.

The receiver 3 and the transmitter 4 may use one or more wireless communication technologies, e.g. Wi-Fi (IEEE 802.11) for communicating with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the lighting devices 31-33 are controlled by the mobile device 1 via the bridge 16. In an alternative embodiment, one or more of the lighting devices 31-33 are controlled by the mobile device 1 without a bridge, e.g. via the Internet server 13 and the wireless LAN access point 17 or directly via Bluetooth. The lighting devices 31-33 may be capable of receiving and transmitting Wi-Fi signals, for example.

Figure 2:
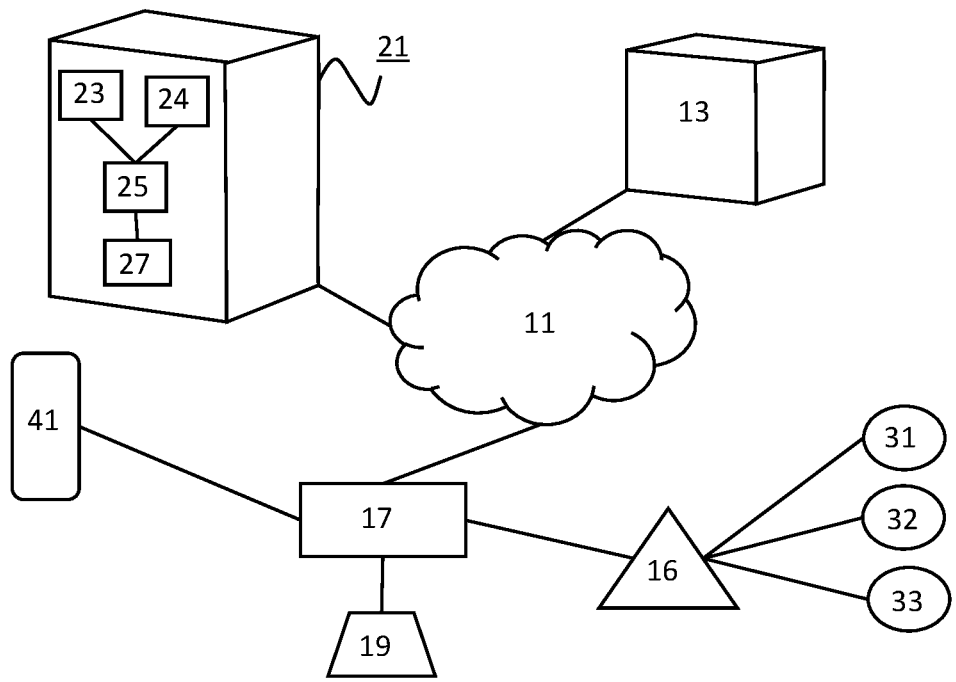
FIG. 2 is a block diagram of a second embodiment of the system.

FIG. 2 shows a second embodiment of the system for controlling a lighting device to render light effects while an audio rendering device 41 plays a song. In this second embodiment, the system is a computer 21. The computer 21 is connected to the Internet 11 and acts as a server. The computer 21 may be operated by a lighting company, for example. In the embodiment of FIG. 2, the computer 21 is able to control the lighting devices 31-33 via the wireless LAN access point 17 and the bridge 16.

The computer 21 comprises a receiver 23, a transmitter 24, a processor 25, and storage means 27. The processor 25 is configured to receive, from the Internet server 13, via the receiver 23, information which is indicative of a plurality of sections of a song and determine, from the information, a first median or average of an audio characteristic in a first section of the plurality of sections and a second median or average of the audio characteristic in a second consecutive section of the plurality of sections, e.g. for each two consecutive sections of the song.

The processor 25 is further configured to determine whether a difference between the first and second medians or averages exceeds a threshold, determine the light effects based on the information, gradually reduce a light intensity and/or color saturation of the light effects during a period before the start of the second section in dependence on the difference exceeding the threshold, and control, via the transmitter 24, one or more of the lighting devices 31-33 to render the light effects.

Figure 3:
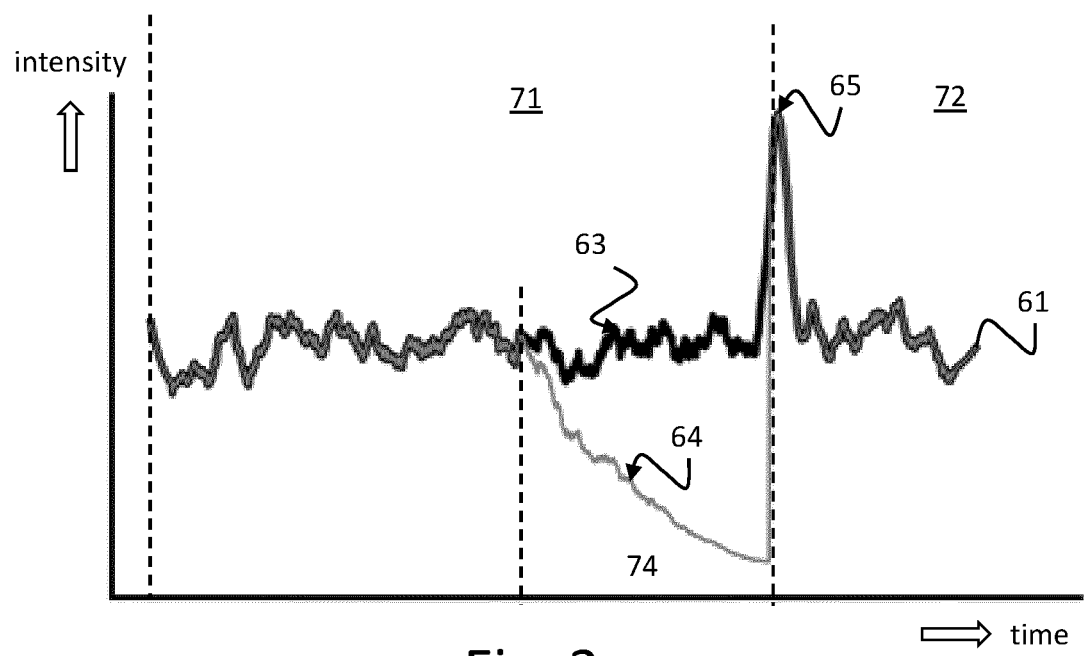
FIG. 3 shows a graph depicting changes to light intensity over time.

In the embodiment of the computer 21 shown in FIG. 3, the computer 21 comprises one processor 25. In an alternative embodiment, the computer 21 comprises multiple processors. The processor 25 of the computer 21 may be a general-purpose processor, e.g. from Intel or AMD, or an application-specific processor. The processor 25 of the computer 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to communicate with the wireless LAN access point 17, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The computer 21 may comprise other components typical for a computer such as a power connector. The invention may be implemented using a computer program running on one or more processors.

In the embodiment of FIG. 2, the computer 21 transmits data to the lighting devices 31-33 via the bridge 16. In an alternative embodiment, the computer 21 transmits data to the lighting devices 31-33 without a bridge.

FIG. 3 shows a graph depicting changes to light intensity over time. FIG. 3 shows two sections 71 and 72 of a song and illustrates how the start of section 72 is a key moment that is highlighted by dimming down the lights prior to this key moment and returning to the original light intensity when the key moment occurs. The start of section 72 has been identified as key moment, because the difference between the first median or average of the audio intensity in section 71 and a second median or average of the audio intensity in section 72 exceeds a threshold, e.g. 5 dB. Changes to audio intensity over time are not shown in FIG. 3. In an implementation, the start of section 72 is only identified as key moment if the second median or average is higher than the first median or average.

In FIG. 3, the line 61 indicates the light intensity signal. Segment 63 of line 61 indicates the original intensity signal. As can be seen, the light intensity peaks at the moment section 72 starts, i.e. at moment 65. Even though this peak clearly stands out, it may be accentuated even further by reducing the light intensity in anticipation of this peak. This is illustrated with alternative segment 64 of the light intensity signal, which is identical to the original signal, but introduces the anticipatory fading to maximize contrast with the peak event during a period 74.

Figure 4:
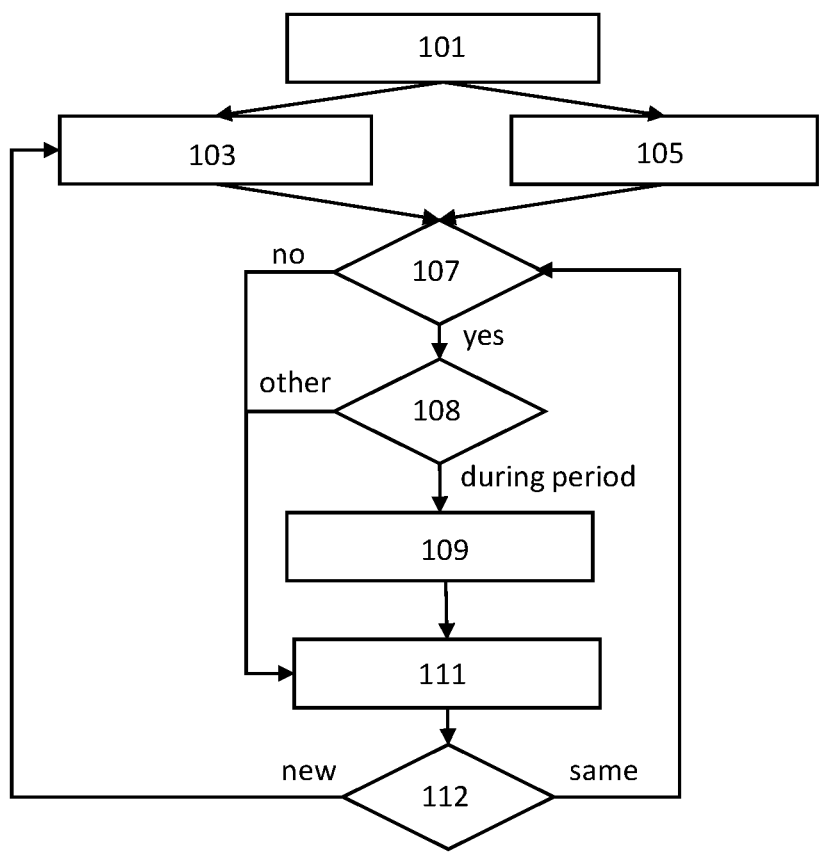
FIG. 4 is a flow diagram of a first embodiment of the method.

A first embodiment of the method of controlling a lighting device to render light effects while an audio rendering device plays a song is shown in FIG. 4. The method may be performed by the mobile device 1 of FIG. 1 or the cloud computer 21 of FIG. 2, for example.

A step 101 comprises receiving information from an audio streaming service. The information is indicative of a plurality of sections of the song. In the embodiment of FIG. 4, information indicative of all sections of the song is received in a single iteration of step 101. Therefore, step 101 only needs to be performed once per song. In an alternative embodiment, the information is streamed, multiple parts of the information are received during the playback of the song, and step 101 is performed multiple times.

A step 105 comprises determining light effects based on the information received in step 101. In the embodiment of FIG. 4, the light effects for the entire song are determined in a single iteration of step 105 and step 105 therefore only needs to be performed once per song. In the alternative embodiment mentioned above, step 105 may be performed multiple times per song, e.g. after receipt of each part of the information. In a further alternative embodiment, step 101 is only performed once per song, but step 105 is performed multiple times per song.

A step 103 comprises determining, from the information received in step 101, a first median or average of an audio characteristic (e.g. audio intensity) in a first section and a second median or average of the audio characteristic in a second consecutive section. For example, in the first iteration of step 103, this determination is made for the first two sections of the song. In the embodiment of FIG. 4, step 103 is performed multiple times, once for each section that has a consecutive section (i.e. once for each section except the last one). In an alternative embodiment, the medians or averages of all sections are determined in a single iteration of step 103. The start and end of each section may be indicated in the information received in step 101 or may be determined from data points comprised in the information received in step 101, for example.

A step 107 comprises determining whether a difference between the first and second medians or averages, as determined in step 103, exceeds a threshold. In the embodiment of FIG. 4, step 107 is performed per light effect for each of the light effects determined in step 105. In each iteration, step 107 is performed for the light effect to be rendered next at a certain moment in the current section of the song. The difference evaluated in step 107 represents a difference between the current section (the first section of the consecutive sections) and the next section (the second section of the consecutive sections). If it is determined in step 107 that this difference (as determined in the last iteration of step 103) does not exceed the threshold, a step 111 is performed directly after step 107.

If it is determined in step 107 that this difference exceeds the threshold, a step 108 is performed. Before step 108 is performed, it may be determined in step 107 exactly in which period before the start of the next section the anticipatory fading should be applied. This may involve analyzing the build-up in the music that leads to the start of the next section. This analysis may be performed in step 103, for example. Alternatively, the start of the period may be determined to occur a fixed time before the start of the next section, e.g. between 5 and 15 seconds before the start of the next section.

The threshold may be the same for each pair of consecutive sections but may also be different for a first pair of consecutive sections than for a second pair of consecutive sections. For example, if the sections have been classified, the threshold may be influenced by the types of the sections. For instance, for transitions from "introduction" to first "verse" and for transitions to and from "bridge", a lower threshold may be used, while for transitions from "chorus" to "verse", a higher threshold may be used.

Step 108 comprises determining in which period of the current section the next light effect will be rendered. If it is determined that the next light effect will be rendered during the above-mentioned period before the start of the next section, a step 109 is performed next. Otherwise, step 111 is performed directly after step 108. Step 109 comprises gradually reducing a light intensity and/or color saturation of the light effects rendered during the above-mentioned period before the start of the next section.

Step 111 comprises controlling a lighting device to render the next light effect, including adjustment if an adjustment was made in step 109. A step 112 is performed after step 111. Step 112 comprises determining whether the light effect to be rendered after the light effect that has just been rendered, belongs to a new section. If so, step 103 is repeated, and the method proceeds as shown in FIG. 4. If it is determined in step 112 that this light effect belongs to the same section, step 107 is repeated, and the method proceeds as shown in FIG. 4.

Figure 5:
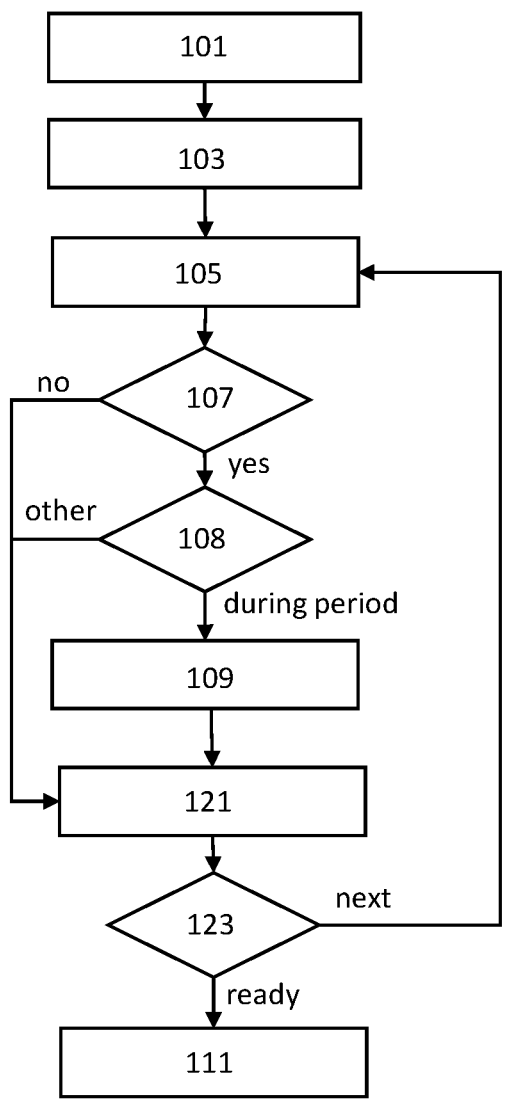
FIG. 5 is a flow diagram of a second embodiment of the method.

A second embodiment of the method of controlling a lighting device to render light effects while an audio rendering device plays a song is shown in FIG. 5. The method may be performed by the mobile device 1 of FIG. 1 or the cloud computer 21 of FIG. 2, for example. The embodiment of FIG. 5 is a variation on the embodiment of FIG. 4.

In the embodiment of FIG. 5, the medians or averages of all sections are determined in a single iteration of step 103. In step 105, a light effect is determined that will be rendered at a certain moment in a certain section of the song. In the first iteration of step 105, the first light effect is determined. If it is determined in step 107 that the difference between the median or average of the audio characteristic in this certain section and the median or average in the next section succeeding this certain section exceeds the threshold and it is determined in step 108 that the certain moment in the certain section falls in a period before the start of the next section, step 109 is performed next.

This period may start between 5 and 15 seconds before the start of the next section (and thus have a duration of between 5 and 15 seconds) but could also start much later. For example, if a highest light intensity setting is used to create the light effects, the duration of many light effects is shorter than one second and the period could then also have a duration of less than one second. The duration of the period may additionally or alternatively be determined based on the duration of the first section.

The anticipatory fading is implemented in step 109. The fading could be done on intensity, but also on e.g. color saturation (desaturating the signal prior to the key event), or colorfulness (e.g. number of different colors in the scene) or a combination thereof. In a step 121, a light script that includes the anticipatory fading is created.

Next, a step 123 comprises determining whether there is a next light effect to be determined. If so, step 105 is repeated for the next light effect and the method proceeds as shown in FIG. 5. If it is determined in step 123 that all light effects have been created and the light script is ready, step 111 is performed. Step 111 comprises controlling one or more lighting devices to render the determined light effects. For example, the light script may be streamed to the connected luminaires.

In the embodiment of FIG. 5, the light effects still need to be created, e.g. based on data points received from the audio streaming service or based on a local analysis of the song. In an alternative embodiment, a predefined content-based light script is obtained. In this alternative embodiment, step 105 may be performed between steps 108 and 109 and may comprise extracting the light effect to be adjusted from the light script. The light effect adjusted in step 109 may then be stored in the light script in step 121. Thus, in this alternative embodiment, the existing light script would be adjusted in step 121. This may be an offline process. For instance, a system may retrieve light scripts for the audio or video content that the user has stored or that the system expects the user to play shortly and adjust the light scripts to include the anticipatory fading.

Figure 6:
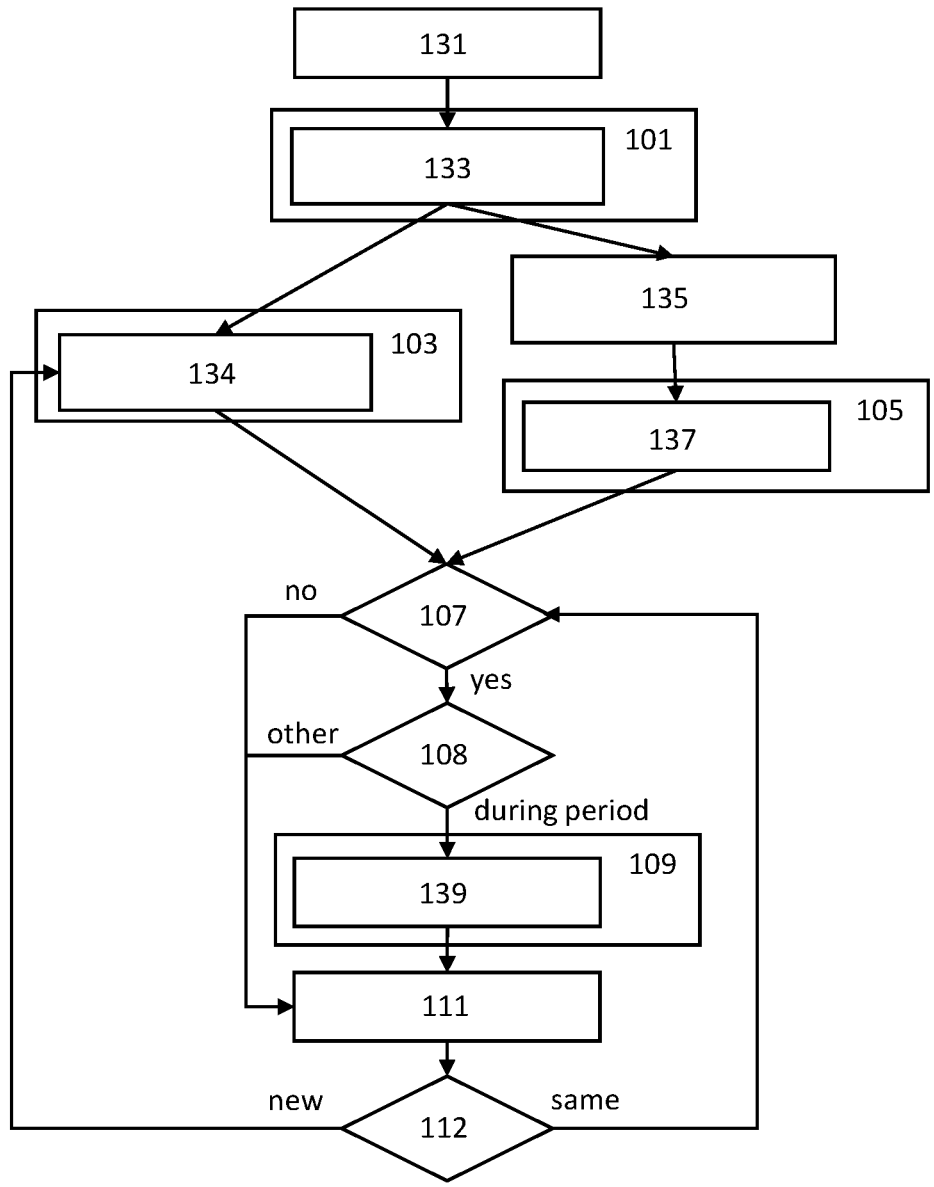
FIG. 6 is a flow diagram of a third embodiment of the method.

A third embodiment of the method of controlling a lighting device to render light effects while an audio rendering device plays a song is shown in FIG. 6. The embodiment of FIG. 6 is an implementation of the embodiment of FIG. 4. In the embodiment of FIG. 6, a step 131 is performed before step 101, step 101 is implemented by a step 133, step 103 is implemented by a step 134, a step 135 is performed before step 105, step 105 is implemented by a step 137, and step 109 is implemented by a step 139.

Step 131 comprises obtaining lighting control limitations set by a user. In the embodiment of FIG. 6, step 131 comprises determining the current user settings/preferences, e.g. the dynamics settings (e.g. low, medium or intense), the current color palette, and/or a lighting system setup.

Step 133 comprises receiving information from the audio streaming service which comprises data points for the plurality of sections of the song. Step 134 comprises determining the first and second medians or averages from the data points received in step 133.

Step 135 comprises selecting a subset of the received data points of which the audio intensity exceeds a further threshold. Step 137 comprises determining the light effects based on the data points selected in step 135 such that they comply with the lighting control limitations obtained in step 131. Step 139 comprises gradually reducing a light intensity and/or color saturation of the light effects but such that the reduced intensity and/or color saturation still complies with the lighting control limitations obtained in step 131.

In step 139, the user settings/preferences light effects determined in step 131 are taken into account while adjusting the light effects to include the anticipatory fading. As a first example, the reduced light intensity is not reduced below a user specified minimum light intensity. As a second example, a dynamics setting of 'low' may result in a more subtle anticipatory fading than a dynamics setting of e.g. 'intense'. Other user preferences could offer users the possibility to indicate whether they want to emphasize identified content key moments with special light effects, and to what extent (e.g. mild-medium-boost).

Figure 7:
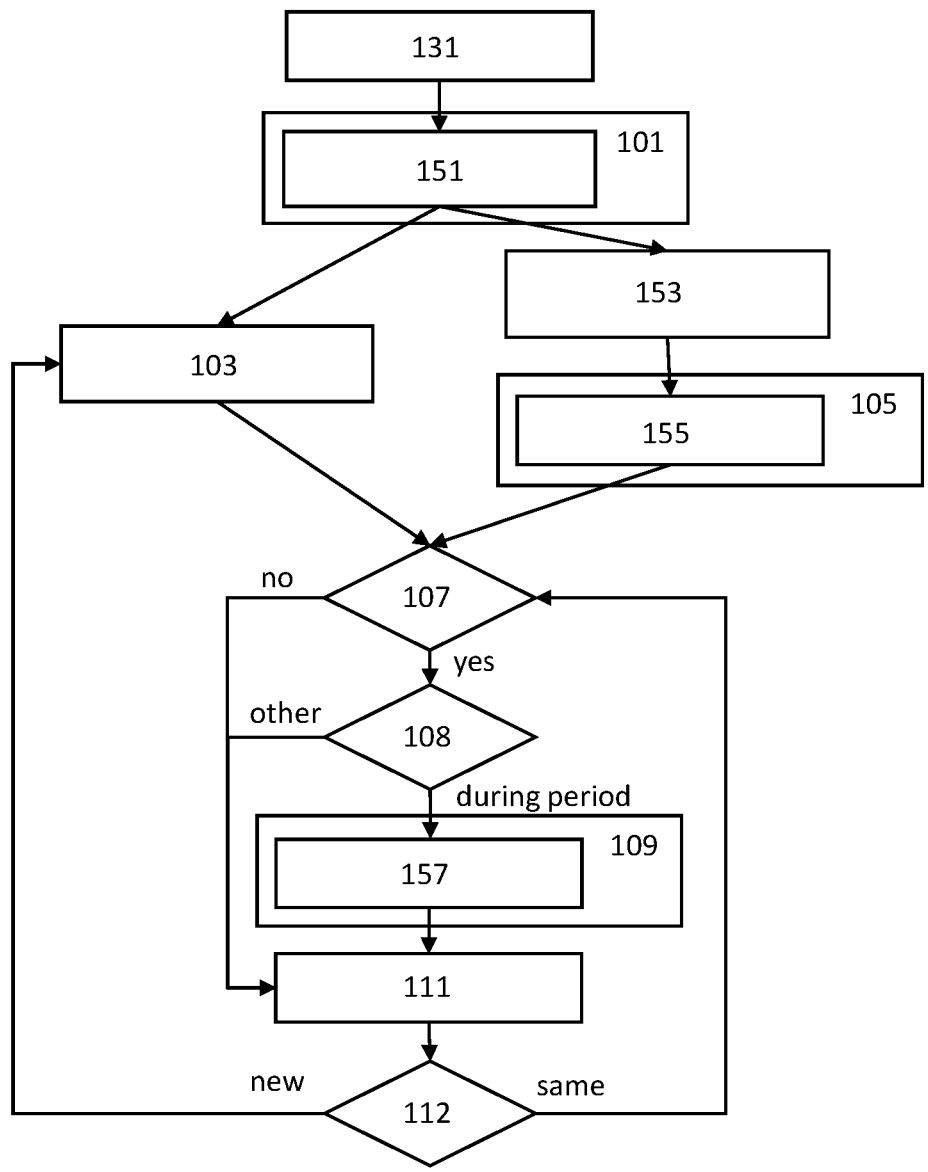
FIG. 7 is a flow diagram of a fourth embodiment of the method.

A fourth embodiment of the method of controlling a lighting device to render light effects while an audio rendering device plays a song is shown in FIG. 7. The embodiment of FIG. 7 is an implementation of the embodiment of FIG. 4. In the embodiment of FIG. 7, a step 131 is performed before step 101, step 101 is implemented by a step 151, a step 153 is performed before step 105, step 105 is implemented by a step 155, and step 109 is implemented by a step 157.

Step 131 comprises obtaining lighting control limitations set by a user, as described in relation to FIG. 6. Step 133 comprises receiving information from the audio streaming service which comprises the information indicative of a plurality of the sections of the song in addition to the song itself. The information may indicate where each section begins, for example. Step 153 comprises analyzing the song. Step 155 comprises determining the light effects based on the analysis performed in step 153. In step 155, the light effects are determined such that they comply with the lighting control limitations obtained in step 131.

Step 157 comprises gradually reducing a light intensity and/or color saturation of the light effects but without requiring that the reduced intensity and/or color saturation complies with the lighting control limitations obtained in step 131. In other words, the lighting control limitations obtained in step 131 are ignored when performing the reduction of the light intensity and/or color saturation.

Figure 8:
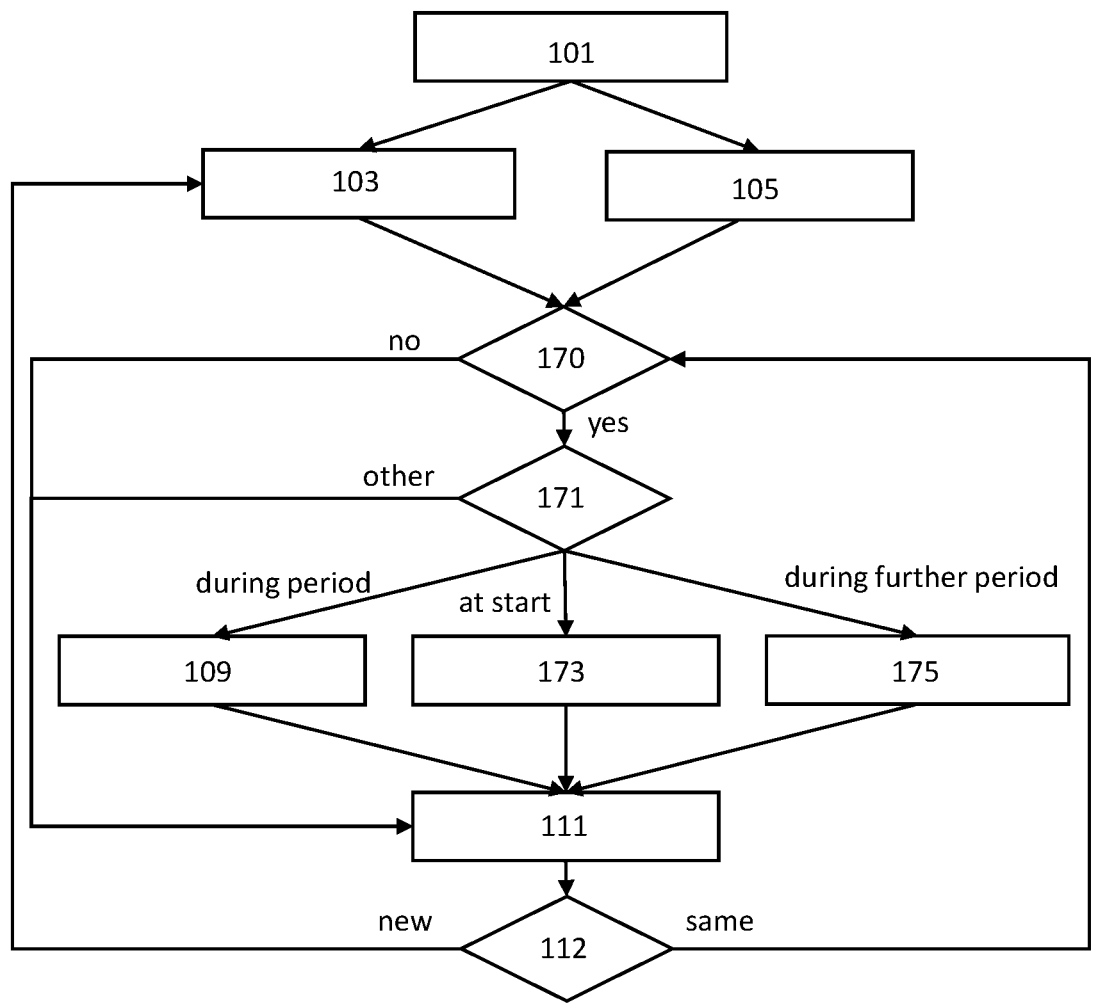
FIG. 8 is a flow diagram of a fifth embodiment of the method.

A fifth embodiment of the method of controlling a lighting device to render light effects while an audio rendering device plays a song is shown in FIG. 8. The embodiment of FIG. 8 is an extension of the embodiment of FIG. 4. Besides adjusting light effects (just) before the key moment, light effects during and after the key moment may also be adjusted. For instance, the light intensity and color saturation of the light may be amplified at and after the key moment. This may depend on user preferences.

In the embodiment of FIG. 8, steps 107 and 108 of FIG. 4 has been replaced with steps 170 and 171 and new steps 173 and 175 have been added. Step 170 comprises determining whether a difference between the first and second medians or averages determined in the last iteration of step 103 exceeds a threshold and whether a difference between the first and second medians or averages determined in the second last iteration of step 103 exceeds the threshold. If it is determined in step 170 that at least one of the differences exceeds the threshold, step 171 is performed. If not, step 111 is performed directly after step 170.

Step 171 comprises determining in which part of the current section the next light effect will be rendered and determining which step should be performed next in dependence on the determined part.

If it was determined in step 170 that the difference determined in the last iteration of step 103 exceeds the threshold and it is determined in step 171 that the next light effect is to be rendered during a period (e.g. of between 5 and 15 seconds) before the start of the next section, step 109 is performed next. Step 109 comprises gradually reducing a light intensity and/or color saturation of the light effects rendering during this period.

If it was determined in step 170 that the difference determined in the second last iteration of step 103 exceeds the threshold and it is determined in step 171 that the next light effect to be rendered is the first light effect or one of the first light effects of the current section, step 173 is performed. Thus, in this case, the next light effect is rendered at the start of the second section of the two consecutive sections which have been compared in the second last iteration of step 103.

Step 173 comprises increasing the light intensity and/or color saturation of the next light effect. If lighting control limitations set by a user have been obtained, as described in relation to step 131 of FIGS. 6 and 7, these lighting control limitations may be ignored when performing the increase of the light intensity and/or color saturation in step 173.

If it was determined in step 107 that the difference determined in the second last iteration of step 103 exceeds the threshold and it is determined in step 171 that the next light effect is to be rendered during a further period immediately after the start of the current section, step 175 is performed. Thus, in this case, the next light effect is the light effect or one of the light effects that will be rendered immediately after the start of the second section of the two consecutive sections which have been compared in the second last iteration of step 103. Step 175 comprises gradually reducing the increase, realized previously in step 173, during the further period.

If it is determined in step 171 that none of the conditions for performing step 109, step 173, or step 175 are met, step 111 is performed directly after step 171. In the intermediate period between the afore-mentioned period and the afore-mentioned further period, step 111 is always performed directly after step 171. If the difference determined in the second last iteration of step 103 did not exceed the threshold, step 111 is also performed directly after step 171 at the start of the current section and in the further period immediately after the start of the current section. If the difference determined in the last iteration of step 103 did not exceed the threshold, step 111 is also performed directly after step 171 in the period before the start of the next section.

Figure 9:
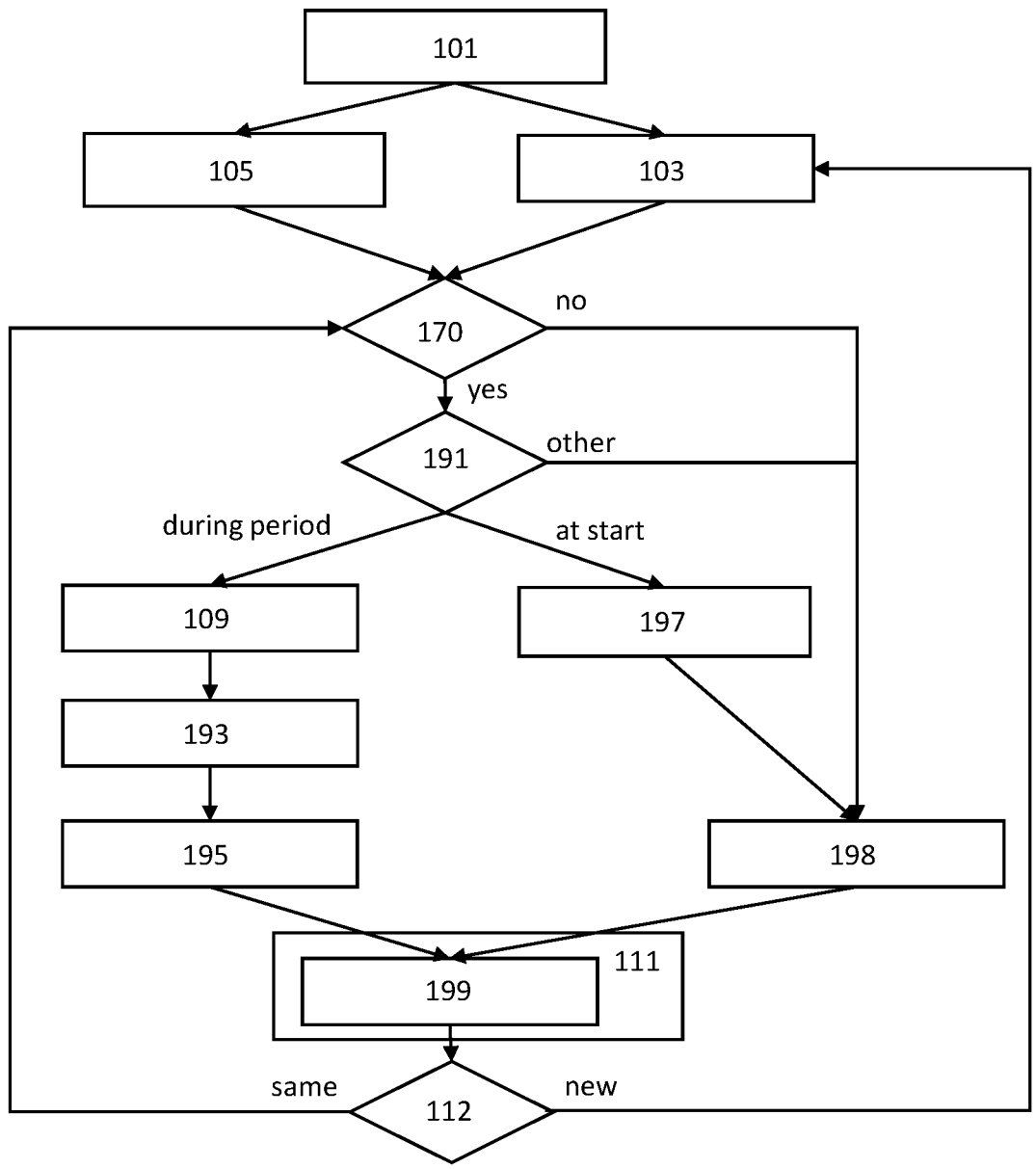
FIG. 9 is a flow diagram of a sixth embodiment of the method.

A sixth embodiment of the method of controlling a lighting device to render light effects while an audio rendering device plays a song is shown in FIG. 9. The embodiment of FIG. 9 is a variation on the embodiment of FIG. 8. In the embodiment of FIG. 9, step 173 has been replaced with a step 197, step 175 has been omitted, step 111 is implemented by a step 199, and steps 193, 195, and 198 have been added.

Furthermore, since step 173 of FIG. 8 has been replaced with step 197 and step 175 of FIG. 8 has been omitted, step 107 of FIG. 8 has been replaced with a step 191. If it is determined in step 191 that none of the conditions for performing step 109 or step 197 are met, step 198 is performed directly after step 171, i.e. before step 111 is performed.

If it was determined in step 170 that the difference determined in the second last iteration of step 103 exceeds the threshold and it is determined in step 191 that the next light effect to be rendered is the first light effect or one of the first light effects of the current section, step 197 is performed. Step 197 comprises controlling the lighting device to render a special light effect at the start of the current section. Step 198 is performed after step 197. Step 198 comprises selecting all lighting devices of a plurality of lighting devices.

If it was determined in step 170 that the difference determined in the last iteration of step 103 exceeds the threshold and it is determined in step 191 that the next light effect is to be rendered during a period before the start of the next section, step 109 is performed next, as described in relation to FIG. 8.

Step 193 is performed after step 109. Step 193 comprises determine a level of the reduction of the light intensity and/or color saturation based on the difference between the first and second medians or averages, as determined in the last iteration of step 103. In other words, step 193 comprises determining how deep the deep the fade out goes. In an alternative embodiment, step 193 is combined with step 170. Before step 191 is performed, it may be determined in step 170 in which period before the start of the next section anticipatory fading should be applied and how deep the fade out goes.

In the embodiment of FIG. 9, the difference between the first and second medians or averages is considered to represent the build-up in the music that leads to the start of the next section and the level of the reduction thus depends on this build-up in the music. Alternatively, the build-up in the music may be determined in a different manner, e.g. by analyzing only a part of the current section and/or based on the approximate duration of the build-up. If the build-up is very audible, starting to fade earlier and deeper could be seen as a very natural effect, while if build up is (almost) absent, the fade out should preferably also be done faster, otherwise it might confuse the user of why lights are changing without an audible change in the music, and might even ruin the effect of the key moment by hinting the listener that it is coming up.

As mentioned in relation to step 108 of FIG. 5, the fade out period may also be done faster if a highest light intensity setting is used to create the light effects. Moreover, the depth of the fade out and/or the depth of the light intensity increase at the start of the next section may also be determined based on the used light intensity setting.

Step 195 is performed after step 193. Step 195 comprises selecting a proper subset of the plurality of lighting devices. Besides intensity and saturation, it is also possible to use spatial dynamics in order to emphasize the key moment. For instance, just before an explosion in a video, only a subset of the lighting devices (the ones close to the TV) may be rendering the content-based light effects, whereas at moment of the explosion all lighting devices in the room (and possible other lighting devices generating an effect in the user's field of view, e.g. the garden) may be included. Knowing the position of individual lighting devices (relative to each other and/or to a media rendering device or user's field of view) may help to create smart spatial effects. For instance, in anticipation of the key moment, the lighting devices in the peripheral view of the user may gradually fade out and become active again at the key moment.

In a similar way, if trumpets will start to play at the start of the next section and this start is determined to be a key moment, the light sources which are selected to render the trumpets may very gradually fade out (e.g. the violin-associated colors) in anticipation of the key moment. At the start of the next section, these light sources may become active again in a different (trumpet-associated) color. Such light sources may either be lighting devices or segments or pixels of a pixelated lighting device.

Step 199 is performed after step 195 or step 198 has been performed. Step 199 comprises controlling the lighting device(s) selected in step 195 or step 198 to render the (possibly adjusted) light effect(s). The same light effects or different light effects may be rendered by multiple lighting devices if multiple lighting devices have been selected.

The embodiments of FIGS. 4 to 9 differ from each other in multiple aspects, i.e. multiple steps have been added or replaced. In variations on these embodiments, only a subset of these steps is added or replaced and/or one or more steps is omitted. As a first example, step 139 of FIG. 6 may be replaced with step 157 of FIG. 7 and/or step 157 of FIG. 7 may be replaced with step 139 of FIG. 6. As a second example, steps 195, 198, and 199 of the embodiment of FIG. 9 may be added to the embodiment of FIG. 8 and/or omitted from the embodiment of FIG. 9. As a third example, the embodiments of FIGS. 8 and 9 may be combined. As a fourth example, the steps added to the embodiment of FIG. 4 to obtain the embodiments of FIGS. 6 to 9 may be added to the embodiment of FIG. 5.

Figure 10:
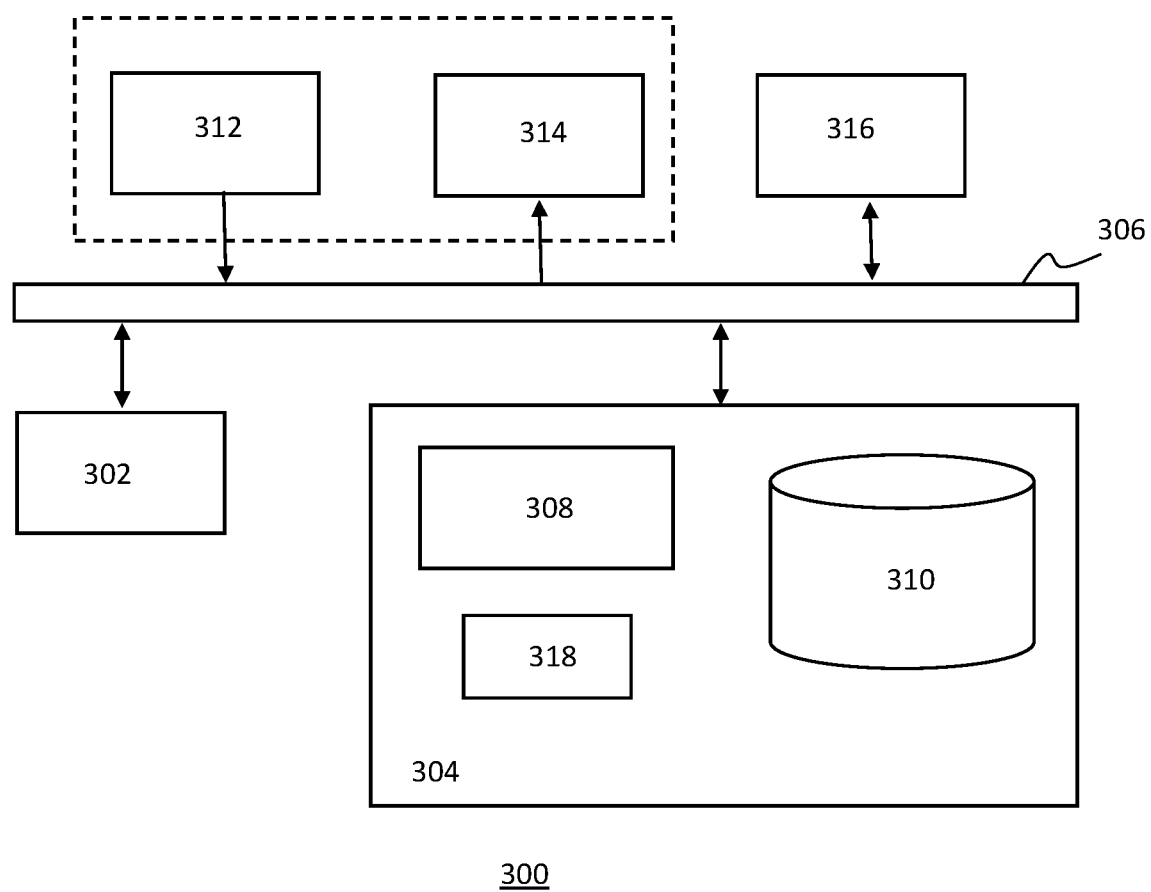
FIG. 10 is a block diagram of an exemplary data processing system for performing the method of the invention.

FIG. 10 depicts a block diagram illustrating an exemplary data processing system that may perform the method as described with reference to FIGS. 4 to 9.

As shown in FIG. 10, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification. The data processing system may be an Internet/cloud server, for example.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 10, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 10) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a lighting device to render light effects while an audio rendering device plays a song, said system comprising:
   at least one receiver;
   at least one transmitter; and
   at least one processor configured to:
      receive information from an audio streaming service via said at least one receiver, said information being indicative of a median or an average of an audio characteristic for each section of a plurality of sections of said song,
      determine, from said information, a first median or average of said audio characteristic in a first section of said plurality of sections and a second median or average of said audio characteristic in a second consecutive section of said plurality of sections,
      determine whether a difference between said first and second medians or averages exceeds a threshold,
      determine said light effects based on said information,
      gradually reduce at least one of a light intensity or color saturation of said light effects during a period before the start of said second section in dependence on said difference exceeding said threshold, and
      control, via said at least one transmitter, said lighting device to render said light effects.

2. A system as claimed in claim 1, wherein said information comprises data points for said plurality of sections of said song and said at least one processor is configured to determine said first and second medians or averages from said data points.

3. A system as claimed in claim 2, wherein said at least one processor is configured to select a subset of said data points, an audio intensity of said selected data points exceeding a further threshold, and determine said light effects based on said selected data points.

4. A system as claimed in claim 1, wherein said audio characteristic comprise audio intensity.

5. A system as claimed in claim 1, wherein said period starts between 5 and 15 seconds before the start of said second section.

6. A system as claimed in claim 1, wherein said at least one processor is configured to obtain lighting control limitations set by a user and comply with said lighting control limitations when performing said reduction of said light intensity or color saturation.

7. A system as claimed in claim 1, wherein said at least one processor is configured to obtain lighting control limitations set by a user and ignore said lighting control limitations when performing said reduction of said light intensity and/or color saturation.

8. A system as claimed in claim 1, wherein said at least one processor is configured to increase said light intensity or color saturation of said light effects at the start of said second section in dependence on said difference exceeding said threshold.

9. A system as claimed in claim 8, wherein said at least one processor is configured to increase said light intensity or color saturation of said light effects during a further period immediately after the start of said second section in dependence on said difference exceeding said threshold and gradually reduce said increase during said further period.

10. A system as claimed in claim 8, wherein said at least one processor is configured to obtain lighting control limitations set by a user and ignore said lighting control limitations when performing said increase of said light intensity or color saturation.

11. A system as claimed in claim 1, wherein said at least one processor is configured to control said lighting device to render a special light effect at the start of said second section in dependence on said difference exceeding said threshold.

12. A system as claimed in claim 1, wherein said at least one processor is configured to control a plurality of lighting devices to render said light effects at the start of said second section and to control a proper subset of said plurality of lighting devices to render said light effects during said period before the start of said second section in dependence on said difference exceeding said threshold.

13. A system as claimed in claim 1, wherein said at least one processor is configured to determine a level of said reduction of said light intensity and/or color saturation based on said difference between said first and second medians or averages.

14. A method of controlling a lighting device to render light effects while an audio rendering device plays a song, said method comprising:
receiving information from an audio streaming service, said information being indicative of a median or an average of an audio characteristic for each section of a plurality of sections of said song;
determining, from said information, a first median or average of said audio characteristic in a first section of said plurality of sections and a second median or average of said audio characteristic in a second consecutive section of said plurality of sections;
determining whether a difference between said first and second medians or averages exceeds a threshold;
determining said light effects based on said information;
gradually reducing at least one of a light intensity or color saturation of said light effects during a period before the start of said second section in dependence on said difference exceeding said threshold; and
controlling said lighting device to render said light effects.

15. A non-transitory computer readable medium comprising computer program code to perform the method of claim 14 when the computer program code is run on one or more processors.

* * * * *